United States Patent [19]
Sibik et al.

[11] Patent Number: 5,586,447
[45] Date of Patent: Dec. 24, 1996

[54] CONCENTRATION CONTROL IN AN ABSORPTION CHILLER

[75] Inventors: Lee L. Sibik; Mark D. Berget, both of Onalaska, Wis.

[73] Assignee: Gas Research Institute, Chicago, Ill.

[21] Appl. No.: 278,539

[22] Filed: Jul. 20, 1994

[51] Int. Cl.$^6$ .................................................. F25B 15/06
[52] U.S. Cl. ............................................. 62/141; 62/148
[58] Field of Search .......................... 62/141, 148, 476, 62/489, 101, 104

[56] References Cited

U.S. PATENT DOCUMENTS

| | | | |
|---|---|---|---|
| 3,604,216 | 9/1971 | Porter | 62/141 |
| 3,626,710 | 12/1971 | Porter | 62/141 |
| 3,626,711 | 12/1971 | Porter | 62/141 |
| 4,269,034 | 5/1981 | Rzechula | 62/141 |
| 4,572,830 | 2/1986 | Biermans et al. | 423/659 |
| 4,676,870 | 6/1987 | Stewart et al. | 159/17.1 |
| 5,246,593 | 9/1993 | Gallup | 210/709 |
| 5,255,534 | 10/1993 | Ryan | 62/476 |
| 5,294,357 | 3/1994 | Ally et al. | 252/67 |

*Primary Examiner*—Henry A. Bennett
*Assistant Examiner*—William C. Doerrler
*Attorney, Agent, or Firm*—Speckman, Pauley & Fejer

[57] ABSTRACT

A process for controlling an absorbent-refrigerant solution concentration in an absorption cooling system to prevent crystallization of the solution in which the crystallization temperature of the absorbent-refrigerant solution is calculated and the temperature of an absorbent-enriched solution, or strong solution, from the absorption unit heat exchanger is measured. Based upon the crystallization temperature and the measured absorbent-enriched solution temperature, the concentration of the absorbent is calculated using an iteration algorithm. Based upon the calculated concentration of absorbent in the absorbent-enriched solution, the concentration of the absorbent-enriched solution is adjusted by adjusting the heat input to the absorption system generator to prevent crystallization of the absorbent.

13 Claims, 2 Drawing Sheets

$\hat{T}_{MARG}$ = CRYSTALLIZATION TEMP MARGIN SETPOINT $T_{MARG}$ = CRYSTALLIZATION TEMP MARGIN $T_{CRYST}$ = CRYSTALLIZATION TEMPERATURE $X$ = SOLUTION CONCENTRATION $\theta_{EV}$ = ENERGY INPUT TO GENERATOR/MAX RATED INPUT $T_{SC}$ = CONDENSER SATURATION TEMPERATURE $T_{SG}$ = SOLUTION TEMP LEAVING GENERATOR $T_{CW}$ = TEMPERATURE OF STRONG SOLUTION LEAVING HEAT EXCHANGER $T_{SH}$ = CONDENSER LEAVING WATER TEMPERATURE

CONCENTRATION CONTROL IN AN ABSORPTION CHILLER

BACKGROUND OF THE INVENTION

1. Field of the Invention

This invention relates to a method for control of solution concentrations in an absorption chiller so as to prevent crystallization of the absorbent. More particularly, this invention relates to a method for control of solution concentrations in a LiBr/water absorption chiller so as to prevent crystallization of the LiBr/water solution.

Efficiency of the absorption cooling process is a function of solution concentration leaving the generator of the absorption system. Absorbent-refrigerant solution from the absorber enters the generator as a sub-cooled liquid. Energy used to raise the temperature of the absorbent-refrigerant solution to its boiling point is not recoverable. Additional energy added will liberate refrigerant from the solution. This energy is recoverable as machine capacity. By controlling absorbent-refrigerant solution concentration, the energy lost to bring the absorbent-refrigerant solution to its boiling point becomes a smaller fraction of the total energy input. As the amount of refrigerant produced increases, the efficiency of the system increases, as does the concentration of absorbent in the absorbent-refrigerant solution. The limit occurs when the absorbent in the absorbent-enriched solution exiting the heat exchanger in which the absorbent-refrigerant solution to the generator is preheated crystallizes. Controlling the concentration of the absorbent-enriched solution to maintain a fixed temperature margin, defined as the difference between the crystallization temperature of the absorbent-enriched solution and the temperature of the absorbent-refrigerant solution exiting the heat exchanger, maximizes cycle efficiency at all operating conditions.

2. Description of Prior Art

Absorption cooling systems are well established in the prior art. In such systems, an absorbent-refrigerant solution from an absorber is heated in a generator to produce an absorbent-refrigerant vapor. The absorbent-refrigerant vapor is separated and condensed, producing a substantially pure liquid refrigerant and an absorbent-enriched solution, that is a regenerated absorbent-refrigerant solution. The absorbent-enriched solution is circulated through a heat exchanger in heat exchange relationship with the absorbent-refrigerant solution from the absorber, preheating the absorbent-refrigerant solution before its introduction into the generator and producing a reduced temperature absorbent-enriched solution, which reduced temperature absorbent-enriched solution is returned to the absorber. The substantially pure liquid refrigerant is evaporated, producing a substantially pure refrigerant vapor, and the substantially pure refrigerant vapor is absorbed into the reduced temperature absorbent-enriched solution in the absorber, producing the absorbent-refrigerant solution.

As previously stated, efficiency of the absorption cooling process is a function of solution concentration leaving the generator. As the amount of refrigerant produced increases, thereby increasing the efficiency of the process, the concentration of absorbent in the absorbent-enriched solution increases, the limit occurring when the solution crystallizes in the heat exchanger. Several methods and apparatuses for controlling and/or preventing crystallization in an absorption cooling system are taught by the prior art. U.S. Pat. No. 3,604,216 teaches a control switch for preventing crystallization in an absorption refrigeration system, which control switch senses a rise in the temperature of the absorbent-enriched solution leaving the solution heat exchanger, which temperature rise is indicative of impending crystallization. A sensor of the control switch actuates controls to cause dilution of the concentrated solution in the heat exchanger in response to the temperature rise, thereby avoiding crystallization.

U.S. Pat. No. 5,255,534 teaches an absorption refrigeration system that operates around a crystallization curve of a solution with a crystallization limitation in which a portion of the absorbent-refrigerant solution from the absorber is mixed with the absorbent-enriched solution from the generator, the mixture being controlled so that the cycle steps around the crystallization curve of the solution.

Crystallization being a function of solution concentration, solution concentration is calculated using the relationship between solution temperature, refrigerant temperature, and concentration. U.S. Pat. No. 4,572,830 teaches a process for determining and controlling the composition of aqueous solutions of ammonia and carbon dioxide in which the density and saturation temperature of the solution is measured and the ammonia, carbon dioxide, and water composition is determined by comparison to densities and saturation temperatures of solutions of known composition, thereby enabling determination of the crystallization concentration at the crystallization temperature. U.S. Pat. No. 5,246,593 teaches a method for controlling deposition of silica scales from aqueous solutions containing large concentrations of dissolved amorphous silica by measuring concentrations of all dissolved solutes to determine the concentration above which silica will precipitate and processing the data, using the Setchnow equation, to generate a signal which can be used for automatically adjusting system parameters to prevent precipitation.

U.S. Pat. No. 4,676,870 teaches a method and apparatus for maintaining a desired concentration of a dissolved solid in the liquid product stream withdrawn from a multi-effect evaporator using temperature and boiling point rise of the solution to determine concentration of the dissolved solid in the solution. A feedforward control signal manipulates the feed inlet in response to steam flow to the first effect evaporator and concentration of the solution in the first and second effect evaporators.

U.S. Pat. No. 4,269,034 teaches an absorption-refrigeration system having a control system which adjusts operation of the absorption unit thereof on the basis of load demand. The control system monitors the temperature of the chilled fluid entering and leaving the evaporator and provides signals accordingly. A differential temperature controller, which receives the probe signals, compares the signals against each other and against predetermined design specifications for the absorption unit, and provides a resultant signal dependent upon the comparisons. Flow control valves, in turn, receive the resultant signal and regulate the flow of the condenser fluid, the chilled fluid, and the heating medium.

U.S. Pat. No. 5,294,357 teaches a method for preparing salt solutions having desired thermodynamic properties employing a mathematical formulation for determining the water activity in the solution at two different high salt concentrations at a reference temperature, wherein the water activity is related to the mole fraction of the water in the solution.

SUMMARY OF THE INVENTION

In order to prevent crystallization of the absorbent-enriched solution circulating through the heat exchanger in heat exchange relationship with the absorbent-refrigerant solution from the absorber while operating the absorption cooling system at maximum efficiency, it is necessary to control solution concentration. Solution concentration is calculated using the equilibrium relationship between absorbent-enriched solution temperature, refrigerant temperature, and concentration.

The relationship between temperatures and concentration is:
$t = A \cdot t' + B$
$A = -(2.00755) + (0.16976) \cdot X - (3.133362\text{E}-3) \cdot X^2 + (1.97668\text{E}-5) \cdot X^3$
$B = 321.128 - (19.322) \cdot X + (0.3743822) \cdot X^2 - (2.0637\text{E}-3) \cdot X^3$
where
$t'$ = Refrigerant Temperature
$t$ = Solution Temperature
$X$ = Concentration Refrigerant and solution temperatures are easy and inexpensive to measure. Using refrigerant and solution temperatures, solution concentration can be determined from the preceding system of equations. The equation can be solved directly for concentration X. The solution involves finding multiple roots of a cubic equation and selecting the correct one. However, the math involved requires the use of square and cubic roots or trigonometric functions and, thus, this approach is too numerically intensive for use in closed loop control.

Accordingly, it is an object of this invention to provide a process for controlling absorbent-enriched solution concentration in an absorption cooling system which is suitable for use in closed loop control.

It is another object of this invention to provide a process for controlling absorbent-enriched solution concentration in an absorption cooling process which improves protection against crystallization of the absorbent-enriched solution.

It is yet another object of this invention to provide a process for controlling absorbent-enriched solution concentration in an absorption cooling system which can adapt to changes in operating conditions, off-design steam pressures, uncalibrated valves, and minor system failures, to maintain the system on line and prevent crystallization of the absorbent-enriched solution.

These and other objects of this invention are achieved by an absorption cooling process in which the absorbent-refrigerant solution from the absorber unit of the absorption cooling system is heated in the generator unit to produce an absorbent-refrigerant vapor which is subsequently separated and condensed, producing a substantially pure liquid refrigerant and an absorbent-enriched solution. The absorbent-enriched solution, also referred to herein as a strong solution or a regenerated absorbent-refrigerant solution, is circulated through a heat exchanger in heat exchange relationship with the absorbent-refrigerant solution from the absorber, thereby preheating the absorbent-refrigerant solution while reducing the temperature of the absorbent-enriched solution. The reduced temperature absorbent-enriched solution is returned to the absorber. A substantially pure liquid refrigerant is evaporated, producing a substantially pure refrigerant vapor, which substantially pure refrigerant vapor is absorbed in the absorber unit into the reduced temperature absorbent-enriched solution, producing the absorbent-refrigerant solution.

To control concentration of the absorbent-enriched solution and prevent crystallization thereof in the heat exchanger, the crystallization temperature of the absorbent-refrigerant solution is calculated and the temperature of the absorbent-enriched solution from the heat exchanger is measured. Based upon the crystallization temperature and the absorbent-enriched solution temperature, the concentration of absorbent in the absorbent-enriched solution is calculated using an iteration algorithm. The concentration of the absorbent-enriched solution is then adjusted to prevent crystallization.

Although the process of this invention may be applied to other absorbent-refrigerant solutions, the preferred absorbent-refrigerant solution is LiBr in water. Thus, crystallization temperature can be calculated from solution concentration and solubility data for LiBr and water. Solubility of LiBr in water is a function of the solution temperature, higher temperatures being able to hold more LiBr in solution. Solubility of LiBr in water as a function of solution temperature has been determined experimentally. See Boryta, D.A. et al., *Solubility of TRANE Lithium Bromide Brine and Pure Lithium Bromine Between −50° C. and 100° C.*, Foote Mineral Company, 1969. The solubility curve set forth therein has been tabularized for table look up.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

Figure 1:
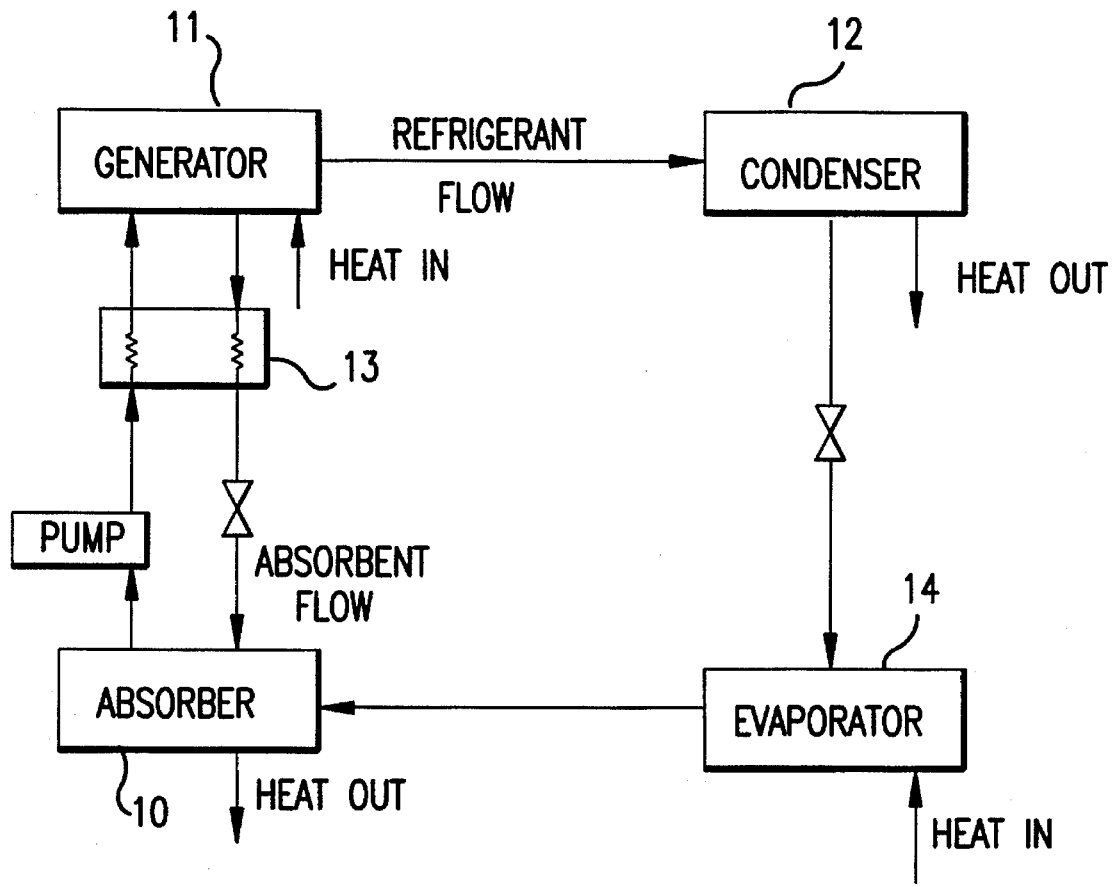
FIG. 1 is a schematic diagram of a typical absorption cooling system.
Figure 3:
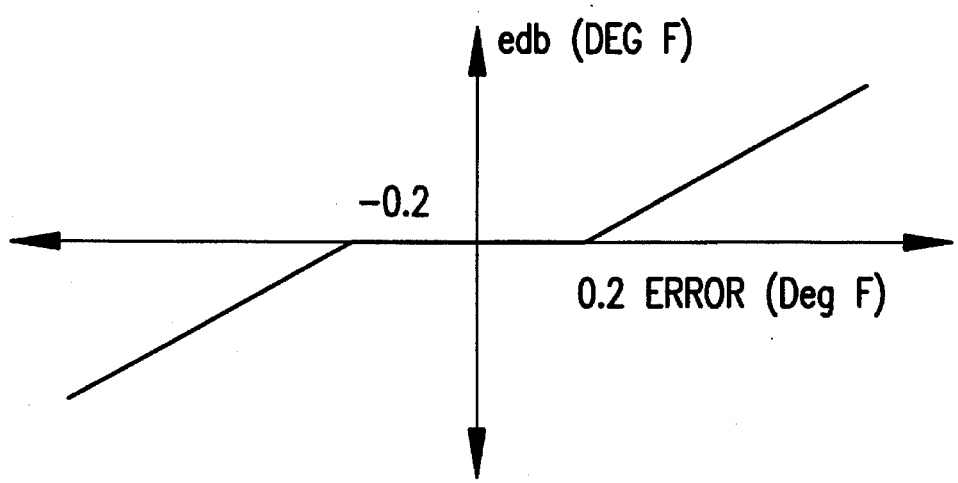
FIG. 3 is a graph showing the deadband function for the concentration control algorithm error of the algorithm used in accordance with one embodiment of this invention.

FIG. 1 shows a schematic diagram of a typical absorption cooling process in which an absorbent-refrigerant solution from absorber 10 is heated in generator 11 producing an absorbent-refrigerant vapor. The absorbent-refrigerant vapor is separated, the refrigerant portion thereof being condensed in condenser 12 producing a substantially pure liquid refrigerant. The absorbent vapor portion of the absorbent-refrigerant vapor is returned to generator 11 forming an absorbent-enriched, that is strong, solution which is circulated through heat exchanger 13 in heat exchange relationship with absorbent-refrigerant solution from absorber 10. In this manner, the absorbent-refrigerant solution from absorber 10 is preheated before entering generator 11 and the absorbent-enriched solution from generator 11 is reduced in temperature. The reduced temperature absorbent-enriched solution is then returned to absorber 10 in which pure refrigerant vapor from evaporator 14 is absorbed into said reduced temperature absorbent-enriched solution, producing the absorbent-refrigerant solution which is then circulated to generator 11 to begin the cycle again. It is apparent that throughout the complete cycle shown in FIG. 1, the concentration of absorbent in the solution circulating between absorber 10 and generator 11 is continuously changing. Absorbent concentration in the absorbent-refrigerant solution from absorber 10 is generally at its lowest level whereas absorbent concentration in the absorbent-enriched solution exiting generator 11 is at its highest level.

In an absorption water chiller, crystallization of the absorbent occurs, if at all, in heat exchanger 13, the point in the absorption cooling cycle at which the absorbent-containing solution is at its lowest temperature, having been used to preheat the absorbent-refrigerant solution entering generator 11, and at the same time has the highest concentration of absorbent. When the temperature of this "strong solution" falls below the saturation temperature for the concentration of absorbent in the solution, crystallization occurs. Thus, it is the concentration of absorbent in the absorbent-enriched solution from generator 11 which must be controlled in order to avoid crystallization of the absorbent-enriched solution in heat exchanger 13.

The process of this invention controls solution concentration and, thus, prevents crystallization of the absorbent in the solution. The process is particularly applicable to LiBr(Lithium Bromide)/water chillers, LiBr being the absorbent and water being the refrigerant.

In the process of this invention, solution concentration is not controlled directly. Rather, the difference between the temperature of the absorbent-enriched solution from generator 11 and the crystallization temperature of the solution is the controlled parameter. Crystallization temperature of the absorbent-refrigerant solution is calculated from solution concentration and solubility data for the absorbent in the refrigerant, in the instant case LiBr in water. As stated hereinabove, solubility of LiBr in water is a function of the solution temperature, higher temperatures being able to hold more LiBr in solution. The temperature of the absorbent-enriched solution from heat exchanger 13 is then measured. Based upon the temperature margin, that is the difference between the absorbent-enriched solution temperature and the crystallization temperature, the concentration of absorbent in the absorbent-enriched solution is calculated using an iteration algorithm. Upon calculation of the concentration of absorbent in the absorbent-enriched solution, the concentration is adjusted by a proportion-integral-derivative feedback loop to prevent crystallization of the absorbent. In particular, the proportional-integral-derivative (PID) controller maintains a set temperature margin by modulating the heat into generator 11 to change solution concentration and crystallization temperature. At every operating condition, the iteration algorithm adjusts concentration of the absorbent-enriched solution to a value just below crystallization, the solution concentration changes resulting in increases or decreases in crystallization temperature as necessary to avoid crystallization.

The advantage of the process of this invention is its ability to adapt to changes in operating conditions of the absorption cooling system. The adaptive nature of this process provides improved protection against crystallization. The process is proactive rather than reactive, solution concentration being calculated and adjusted every five seconds, resulting in continuous response of the control logic to changing operating conditions. If high concentrations are encountered, the algorithm for calculating the solution concentration reduces energy input to generator 11 to lower the solution concentration. On the other hand, if the solution concentration is low, the algorithm increases energy to generator 11 to raise the concentration. The algorithm can adapt to changes in loop conditions, off design steam pressures, uncalibrated valves, and minor system failures to keep the unit on-line and out of crystallization.

Figure 2:
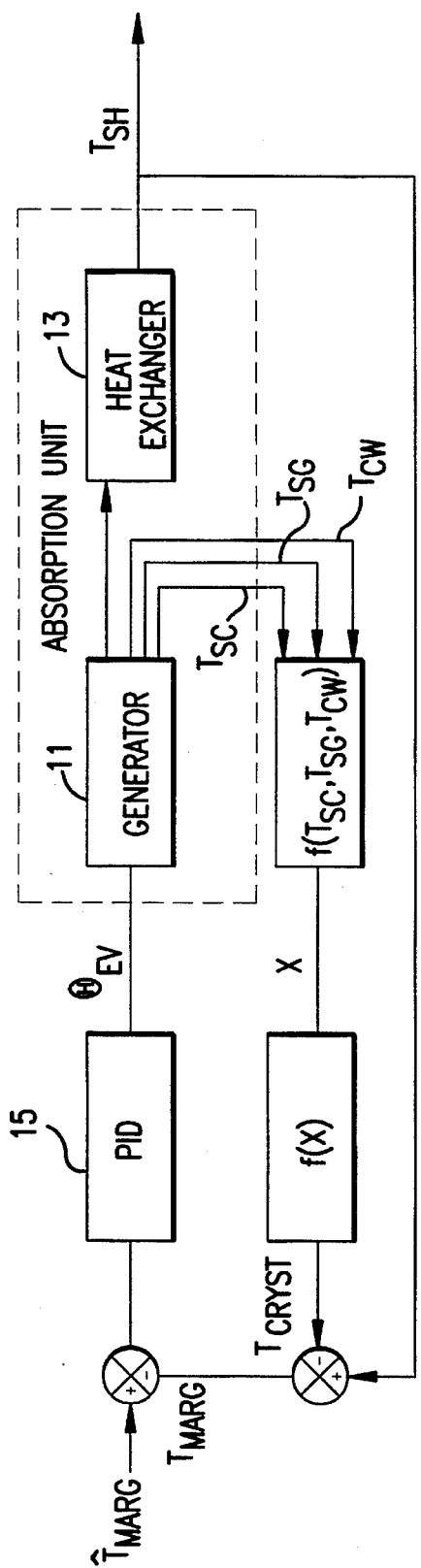
FIG. 2 is a flow diagram of the absorption cooling process in accordance with one embodiment of this invention.

FIG. 2 is a schematic diagram showing the process for controlling solution concentration to prevent crystallization in accordance with one embodiment of this invention. As shown in FIG. 2, the temperature, $T_{SH}$, of the absorbent-enriched solution from heat exchanger 13 is measured and compared to the crystallization temperature, $T_{CRYST}$ to produce the crystallization temperature margin $T_{MARG}$. The crystallization temperature margin, $T_{MARG}$, is compared to a crystallization temperature margin set point, $\hat{T}_{MARG}$, by proportional-integral-derivative controller 15. Proportional-integral-derivative controller 15 then increases or decreases the energy, $\Theta_{EV}$, to generator 11 for altering the solution concentration.

The critical element of the process of this invention is the iteration algorithm by which concentration of the absorbent in the absorbent-enriched solution is calculated based upon the crystallization temperature and the absorbent-enriched solution temperature. Instead of finding multiple roots to a cubic equation to solve for solution concentration as discussed hereinabove, in accordance with the process of this invention, a single solution is found from an initial guess. The previous result is then used as the initial guess for the next pass through the iteration algorithm. Several iteration algorithms are available although a Newton-Raphson iteration is preferred for its fast convergence. In particular, the method for calculating solution concentration using the iteration algorithm in accordance with the process of this invention is as follows:

The first step is to define the function:

$$f(X)=A \cdot t'+B-t$$

where
X=concentration
t'=refrigerant temperature, and
t=solution temperature.

The next step is to calculate the derivative with respect to concentration as follows:

$$f'(X) = \frac{dA}{dX} t' + \frac{dB}{dX}$$

where $$dA/dX=0.16976-(6.266724E-3) \cdot X+(5.93004) \cdot X^2$$

$$dB/dX=(-19.322)+(0.748764) \cdot X-(6.1911E-3) \cdot X^2$$

Iterating on concentration produces:

$$X_n = X_{n-1} - \frac{f(X_{n-1})}{f'(X_{n-1})}$$

until $f(X) \to \epsilon$ where $\epsilon$ is the desired convergence criterion. If the calculated solution concentration is bounded between 45% and 68%, the solution always converges to within 0.1% after 3 iterations. Because this iteration can be programmed with simple math functions, solution concentration is determined with only a fraction of the resources needed by the direct method.

The program for this iteration in accordance with one embodiment of the process of this invention is as follows:
1.) Calculate Strong Solution Concentration
BEGIN
Calculate intermediate parameters
Superheat=4
TSAT=max(SAT_Cond_Temp, Cond_LWT)
P=(A(3) *TSAT+B(3))
Q=(A(2) *TSAT+B(2))
R=(A(1) *TSAT+B(1))
S=(A(0) *TSAT+B(0))-(Tsol-Superheat)
(For the definitions and default values for the variables A(0), A(1), A(2), A(3), B(0), B(1), B(2), and B(3), see Table 1—Crystallization Detection Local Constants.)
Using Newton-Raphson Iteration to solve for concentration:

Initialize concentration to 55% first pass through software.

```
Do i=1 to 3
    f(X)=P*X*X*X+Q*X*X+R*X+S
    f'(X)=3*P*X*X+2*Q*X+R
    Xn=Xn-1-f(Xn-1)/f'(Xn-1)
    Xn=Limit(45,Xn,68)
End Do
Concentration=Xn
End
``` where Limit is a function of the form f(min,value,max) that returns "value" when min≦value≦max, and returns "min" when value<min or "max" when value>max.

TABLE 1

Crystallization Detection Local Constants

| Variable | Description | Units | Default Values |
|---|---|---|---|
| A(0) | Coefficient for 3rd order curve fit | NA | −2.00755 |
| A(1) | Coefficient for 3rd order curve fit | NA | 0.16976 |
| A(2) | Coefficient for 3rd order curve fit | NA | −3.133362E-3 |
| A(3) | Coefficient for 3rd order curve fit | NA | 1.97668E-5 |
| B(0) | Coefficient for 3rd order curve fit | NA | 321.128 |
| B(1) | Coefficient for 3rd order curve fit | NA | −19.322 |
| B(2) | Coefficient for 3rd order curve fit | NA | 0.374382 |
| B(3) | Coefficient for 3rd order curve fit | NA | −2.0637E-3 |

2.) Crystallization Temperature Margin
BEGIN
DATA TABLE/

| CONCENTRATION | TEMPERATURE |
|---|---|
| 53.0 | 0.0 |
| 56.5 | 32.0 |
| 60.0 | 75.2 |
| 61.0 | 82.4 |
| 62.0 | 91.4 |
| 63.0 | 99.0 |
| 64.0 | 109.0 |
| 65.0 | 122.0 |
| 66.0 | 135.0 |
| 67.0 | 160.0 |
| 68.0 | 180.0 |

X=Concentration
DO 1=2,11 UNTIL (TABLE(1,1).GE.X)
C_low=TABLE(1,1-1)
C_high=TABLE (1,1)
T_low=TABLE(2,1-1)
T_high=TABLE (2,1)

Use linear interpolation to calculate crystallization temperature:

$$T_{cryst}=T\_low+(X-C\_low)*(T\_high-T\_low)/(C\_high-C\_low)$$

Calculate margin of safety for the current operating state $$T_{Marg}=T_{sh}-T_{cryst}$$

END
3.) Energy Control
Initialize edb(n−1)=0 and edb(n−2)=0
BEGIN
error=$(\hat{T}_{MARG}-T_{Marg})$ (Compute control error °F.)
edb=Deadband(−0.2,0.2, error) (See FIG. 2)
Kp_part=Kp*[4edb−3*edb(n−1)+edb (n−2)](Proportional term)
Ki_part=Ki*Tsamp*edb (Integral term)
Kd_part=(kd/Tsamp)*[edb−*2*edb(n−1)+edb(n−2)] (Derivative term)
$\Theta_{EV}$=Kp_part+Ki_part+Kd_part (Compute change in energy input)
END While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In an absorption cooling process in which an absorbent-refrigerant solution from an absorber is heated in a generator producing an absorbent-refrigerant vapor, said absorbent-refrigerant vapor is separated and condensed producing a substantially pure liquid refrigerant and an absorbent-enriched solution, said absorbent-enriched solution is circulated through a heat exchanger in heat exchange relationship with said absorbent-refrigerant solution from said absorber producing a reduced temperature absorbent-enriched solution, said reduced temperature absorbent-enriched solution is returned to said absorber, said substantially pure liquid refrigerant is evaporated producing a substantially pure refrigerant vapor, and said substantially pure refrigerant vapor is absorbed into said reduced temperature absorbent-enriched solution producing said absorbent-refrigerant solution, the improvement comprising:

calculating the concentration of absorbent in said absorbent-enriched solution using an iteration algorithm based upon a saturated temperature of said substantially pure refrigerant vapor, said absorbent-enriched solution temperature, and an initial guess of the concentration of absorbent in said absorbent-enriched solution;

calculating a crystallization temperature of said absorbent-refrigerant solution based on a concentration of said absorbent-enriched solution;

measuring the temperature of said absorbent-enriched solution from said heat exchanger; and adjusting the concentration of said absorbent-enriched solution to prevent crystallization of said absorbent.

2. A process in accordance with claim 1, wherein said concentration of said absorbent-enriched solution is adjusted by modulating heat provided to said generator.

3. A process in accordance with claim 1, wherein said concentration is controlled by a proportional-integral-derivative feedback loop controller.

4. A process in accordance with claim 3, wherein said proportional-integral-derivative feedback loop controller controls said concentration by maintaining a set temperature margin defined as the difference between the temperature of said absorbent-enriched solution from said heat exchanger and the crystallization temperature of the absorbent-enriched solution, said set temperature margin being maintained by modulating heat input to said generator, thereby changing the concentration of absorbent in said absorbent-enriched solution and the crystallization temperature of said absorbent-enriched solution.

5. A process in accordance with claim 1, wherein said absorbent-refrigerant solution is LiBr in water.

6. A process for controlling an absorbent-refrigerant solution concentration in an absorption cooling system comprising:

calculating the concentration of absorbent in said absorbent-enriched solution using an iteration algorithm based upon a saturated temperature of said refrigerant vapor, said absorbent-enriched solution temperature, and an initial guess of the concentration of absorbent in said absorbent-enriched solution;

calculating a crystallization temperature of said absorbent-refrigerant solution based on a concentration of an absorbent-enriched solution;

measuring the temperature of an absorbent-enriched solution exiting a heat exchanger, said absorbent-enriched solution having been in heat exchange relationship with said absorbent-refrigerant solution entering a generator of said absorption cooling system; and adjusting the concentration of said absorbent-enriched solution to prevent crystallization of said absorbent.

7. A process in accordance with claim 6, wherein said concentration of said absorbent-enriched solution is adjusted by modulating heat provided to said generator.

8. A process in accordance with claim 6, wherein said concentration is controlled by a proportional-integral-derivative feedback loop controller.

9. A process in accordance with claim 8, wherein said proportional-integral-derivative feedback loop controller controls said concentration by maintaining a set temperature margin defined as the difference between the temperature of said absorbent-enriched solution from said heat exchanger and the crystallization temperature of the absorbent-enriched solution, said set temperature margin being maintained by modulating heat input to said generator, thereby changing the concentration of absorbent in said absorbent-enriched solution and the crystallization temperature of said absorbent-enriched solution.

10. A process in accordance with claim 6, wherein said absorbent-refrigerant solution is LiBr in water.

11. In an absorption cooling process in which an absorbent-refrigerant solution from an absorber is heated in a generator producing an absorbent-refrigerant vapor, said absorbent-refrigerant vapor is separated and condensed producing a substantially pure liquid refrigerant and an absorbent-enriched solution, said absorbent enriched solution is circulated through a heat exchanger in heat exchange relationship with said absorbent-refrigerant solution from said absorber producing a reduced temperature absorbent-enriched solution, said reduced temperature absorbent-enriched solution is returned to said absorber, said substantially pure liquid refrigerant is evaporated producing a substantially pure refrigerant vapor, and said substantially pure refrigerant vapor is absorbed into said reduced temperature absorbent-enriched solution producing said absorbent-refrigerant solution, the improvement comprising:

calculating a crystallization temperature of said absorbent-refrigerant solution;

measuring the temperature of said absorbent-enriched solution from said heat exchanger;

maintaining a set temperature margin defined as the difference between the absorbent-enriched solution temperature and the crystallization temperature of said absorbent-enriched solution by modulating heat input to said generator, thereby altering the concentration of absorbent in said absorbent-enriched solution and the crystallization temperature of said absorbent-enriched solution.

12. A process in accordance with claim 11, wherein said concentration is controlled by a proportional-integral-derivative feedback loop controller.

13. A process in accordance with claim 11, wherein said absorbent-refrigerant solution is LiBr in water.

\* \* \* \* \*